United States Patent
Lin et al.

(10) Patent No.: US 8,282,223 B2
(45) Date of Patent: Oct. 9, 2012

(54) LED LIGHT SOURCE MODULE AND PROJECTION DEVICE COMPRISING THE SAME

(75) Inventors: Tsan-Yi Lin, Taoyuan Hsien (TW); Yun-Chieh Yeh, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 235 days.

(21) Appl. No.: 12/794,135

(22) Filed: Jun. 4, 2010

(65) Prior Publication Data
US 2010/0309437 A1 Dec. 9, 2010

(30) Foreign Application Priority Data
Jun. 4, 2009 (TW) .............................. 98209784 U

(51) Int. Cl.
*G03B 21/14* (2006.01)
(52) U.S. Cl. .............. 353/119; 353/30; 353/31; 353/38; 353/81; 353/94; 353/98; 353/99; 362/310; 362/362
(58) Field of Classification Search .................... 353/30, 353/31, 32, 38, 81, 94, 98, 99, 101, 119; 362/240, 268, 310, 362, 602, 232, 555, 800; 359/638, 640, 625–627, 629, 634, 636, 583, 359/584, 589; 349/5, 7, 8, 9
See application file for complete search history.

(56) References Cited

U.S. PATENT DOCUMENTS

| | | | |
|---|---|---|---|
| 6,193,401 B1 * | 2/2001 | Girkin et al. | 362/551 |
| 6,517,211 B2 * | 2/2003 | Mihara | 353/98 |
| 7,832,878 B2 * | 11/2010 | Brukilacchio et al. | 353/99 |
| 7,929,214 B2 * | 4/2011 | Teijido et al. | 359/629 |
| 7,934,841 B2 * | 5/2011 | Erchak et al. | 353/94 |
| 7,942,537 B2 * | 5/2011 | Krijn et al. | 362/19 |
| 2003/0147055 A1 * | 8/2003 | Yokoyama | 353/98 |
| 2004/0032736 A1 * | 2/2004 | Huang | 362/294 |
| 2005/0088625 A1 * | 4/2005 | Imade | 353/31 |
| 2005/0122486 A1 * | 6/2005 | Trollsch | 353/94 |
| 2006/0139580 A1 * | 6/2006 | Conner | 353/98 |
| 2006/0164600 A1 * | 7/2006 | Morejon et al. | 353/31 |
| 2006/0203352 A1 * | 9/2006 | Pashley | 359/634 |
| 2010/0309391 A1 * | 12/2010 | Plut | 348/756 |

* cited by examiner

*Primary Examiner* — Georgia Y Epps
*Assistant Examiner* — Sultan Chowdhury
(74) *Attorney, Agent, or Firm* — Patterson Thuente Christensen Pedersen, P.A.

(57) ABSTRACT

A LED light source module and a projection device comprising the same are provided. The LED light source module comprises an optical element assembly, a LED assembly and a compartment structure. The compartment structure extends from at least one side edge of the LED assembly to at least one side edge of the optical element assembly, so that the LED assembly, the optical element assembly and the compartment structure form an enclosed space corporately.

15 Claims, 4 Drawing Sheets

LED LIGHT SOURCE MODULE AND PROJECTION DEVICE COMPRISING THE SAME

This application claims the benefit from the priority of Taiwan Patent Application No. 098209784 filed on Jun. 4, 2009, disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to a light source module, and more particularly, to a light emitting diode (LED) light source module.

2. Descriptions of the Related Art

Common projection systems currently available typically use xenon bulbs or ultrahigh-pressure mercury lamps as a light source. However, such projection systems must be provided with a high-voltage power supply circuit and a superior cooling system in conjunction with the xenon bulbs or ultrahigh-pressure mercury lamps. Furthermore, the xenon bulbs and ultrahigh-pressure mercury lamps have disadvantages, such as a short service life, high prices or uneven light intensity distribution. In contrast, light emitting diodes (LEDs) are free from such disadvantages and, therefore, have become a preferable choice for replacing the xenon bulbs and ultrahigh-pressure mercury lamps.

FIG. 1 schematically illustrates a conventional projection device 1 that uses LEDs as a light source. The conventional projection device 1 comprises an imaging module 11 and an LED light source module 12 including a plurality of LED modules 13. The LED modules 13 may be red, green and blue LED module respectively. Because LED modules 13 of different colors do not require the use of an additional color splitting device such as a color wheel, the LED light source module 12 per se can provide the three primary colors to the imaging module 11. Because of the reduced complexity in system design and the reduced cost, great importance has been attached to the development of projection devices that uses LEDs as a light source. Furthermore, as LEDs feature a quick start process, the LED modules 13 may be controlled by a control module to be switched on and off alternately or simultaneously at a high frequency. In this way, the luminance of the individual LED modules 13 can be controlled and the heat concentration caused by the continuous operation of the LED modules 13 be avoided, which would otherwise reduce the light emission efficiency and service life of the LED modules.

Compared to the conventional light sources, the past LED modules still have drawbacks in terms of luminance intensity, so their use in projection devices is greatly restricted. With the continuous development of high current/high power LEDs, the luminance intensity thereof has gradually come to meet the requirements of more applications. Unfortunately, when applied to the structure of the aforesaid LED light source module 12, high current/high power LED modules may experience vibration due to the electromagnetic forces induced by high voltage or high current when switched at a high frequency, resulting in intolerable large noises.

No solutions have been proposed yet to suppress the noises of the LED light source module 12, so although high power LEDs are gradually finding a wide application in projection devices, the users' desires to use such projection devices are compromised due to the overloud noises. Therefore, it is important to provide an LED light source module with high power but low noise for use in a projection device.

SUMMARY OF THE INVENTION

The objective of the present invention is to provide an LED light source module for a projection device. The LED light source module has a noise suppressing structure capable of suppressing noises generated during the operation of LED modules.

The LED light source module disclosed in the present invention comprises an optical element assembly, a LED assembly and a compartment structure. The compartment structure extends from at least one side edge of the LED assembly to at least one side edge of the optical element assembly so that the LED assembly, the optical element assembly and the compartment structure form at least one enclosed space corporately.

By using the compartment structure to enclose the space where LED modules are located, the LED light source module of the present invention can effectively isolate noises generated by switching the LED modules at a high frequency, thereby providing an LED light source system with high power but low noises for the projection device.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, the description of these embodiments is only for purposes of illustration rather than limitation. It should be appreciated that in the following embodiments and the attached drawings, elements unrelated to this invention are omitted from depiction; and dimensional relationships among individual elements in the attached drawings are illustrated only for ease of understanding, but not to limit the actual scale.

Figure 1:
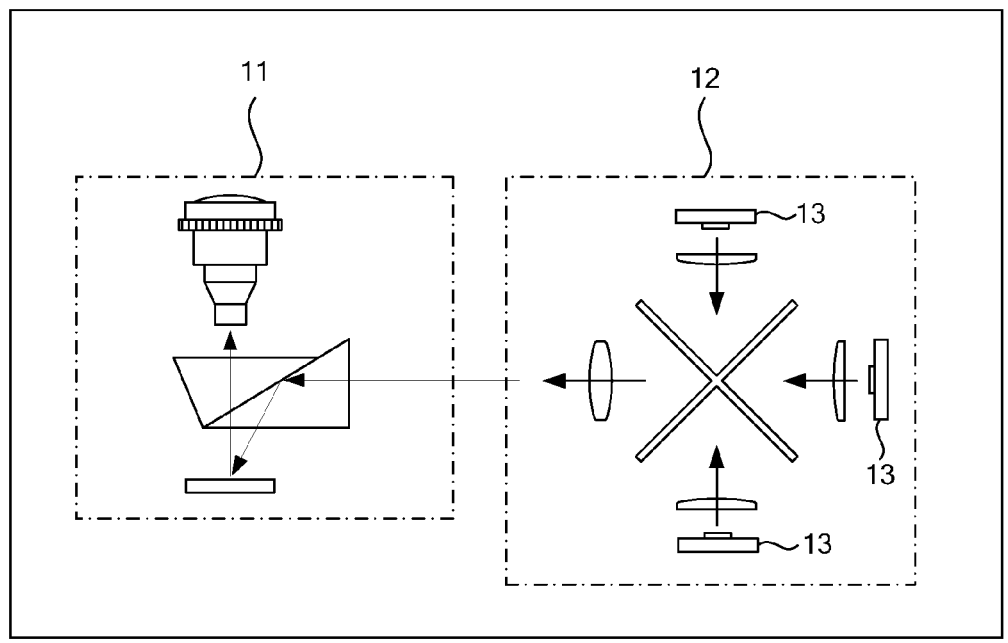
FIG. 1 is a schematic view of a conventional projection device.
Figure 2:
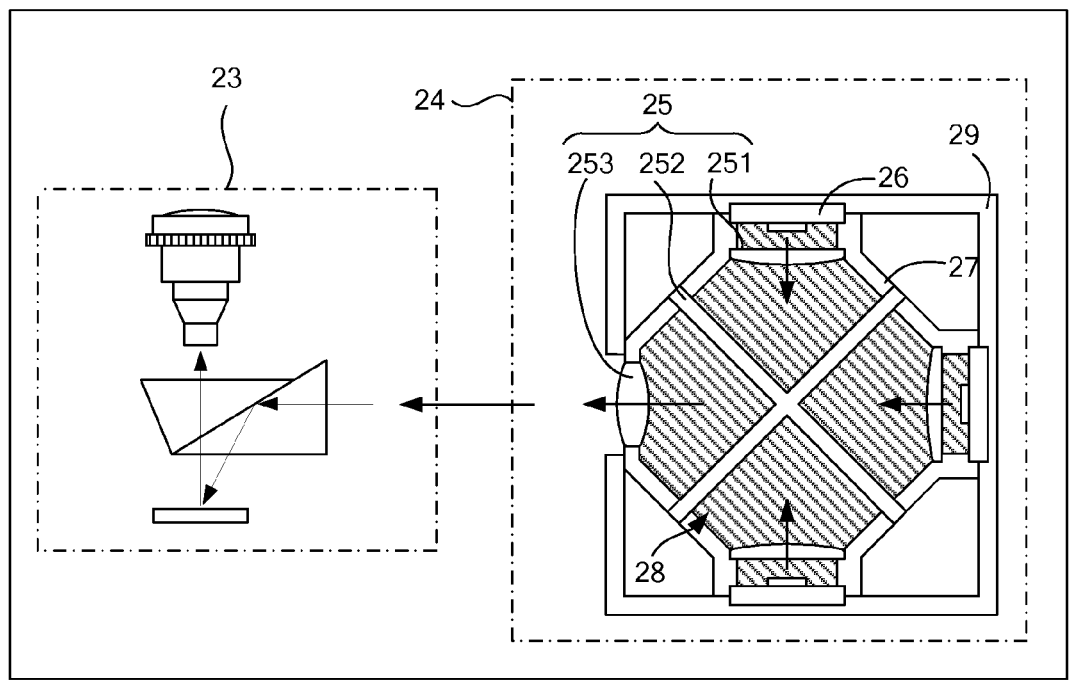
FIG. 2 is a schematic view of a projection device of the present invention.

FIG. 2 depicts a projection device 2 of the present invention. In the projection device 2, a light emitting diode (LED) light source module 24 is configured to provide a light beam to an imaging module 23 to produce and project an image. The LED light source module 24 comprises an optical element assembly 25, an LED assembly 26, a compartment structure 27 and a housing 29. The housing 29 at least receives the LED assembly 26, the optical element assembly 25 and the compartment structure 27. The compartment structure 27 extends from at least one side edge of the LED assembly 26 to at least one side edge of the optical element assembly 25 so that the LED assembly 26, the optical element assembly 25 and the compartment structure 27 form an enclosed space 28 corporately as shown by the hatched portion in FIG. 2. With this arrangement, noises produced by the LED assembly 26 are restricted within the enclosed space 28 and noises emitted out of the LED module 24 are mitigated.

Generally, the optical element assembly 25 comprises at least one relay lens 251, a light coupling component 252 and a condenser lens 253. In other examples, there may be other forms and numbers of optical components in the optical element assembly 25, and this may also accomplish the objective of the present invention provided that the compartment structure 27 is adjusted accordingly to form an appropriate enclosed space 28. Light beams emitted from the LED assembly 26 are condensed by the relay lens 251 and transferred to the light coupling component 252. The light coupling component 252 is adapted to couple a plurality of light beams emitted from the LED assembly 26 and transfer the coupled light beam to the condenser lens 253 for projection onto the imaging module 23.

Figure 3:
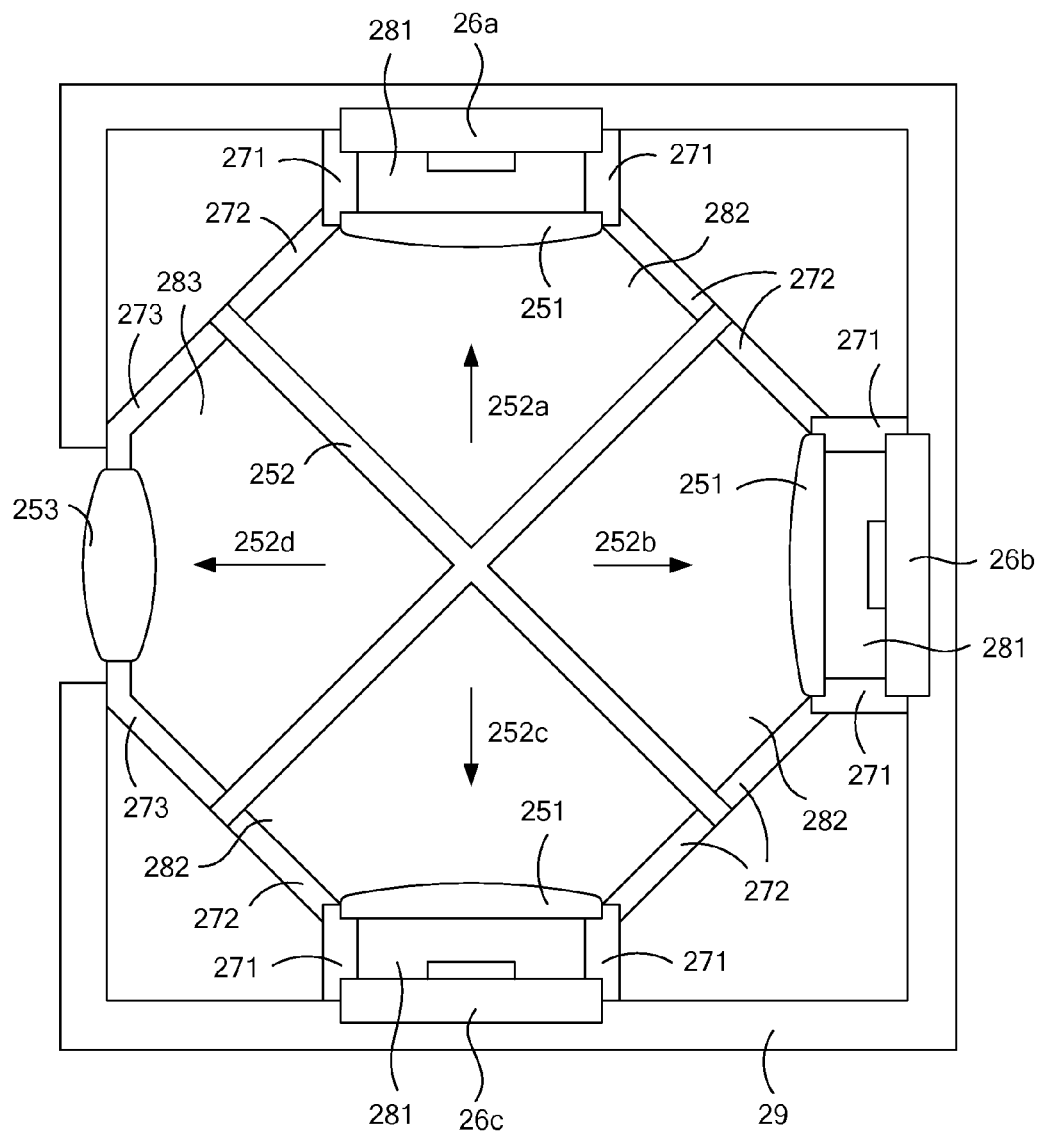
FIG. 3 is a schematic view of a preferred example of an LED light source module of the present invention.
Figure 4:
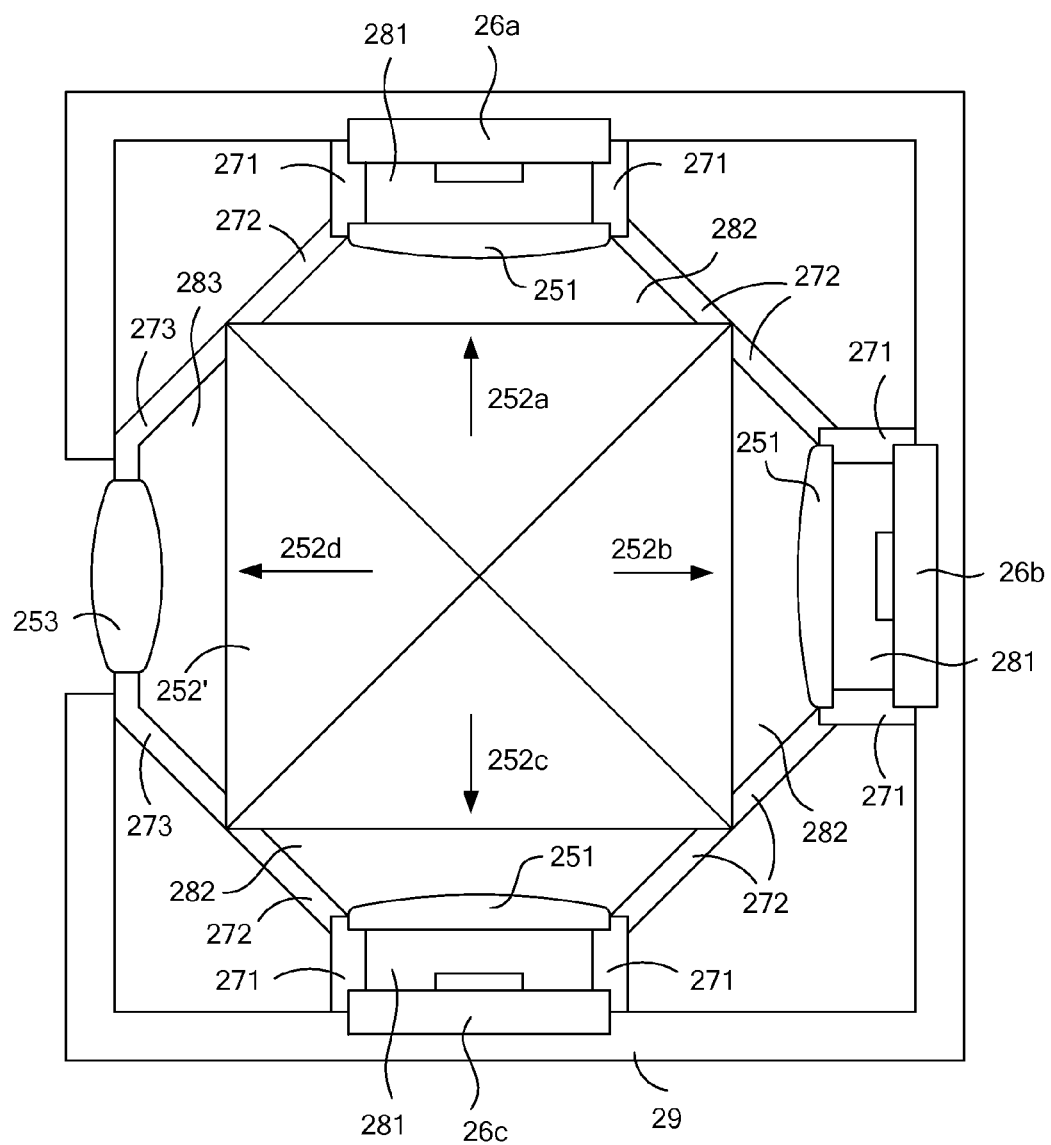
FIG. 4 is a schematic view of another preferred example of the LED light source module of the present invention.

FIG. 3 depicts an LED light source module 24 according to a preferred embodiment of the present invention. In reference to FIGS. 2 and 3, in this embodiment, the light coupling component 252 is an x-plate with a first lateral direction 252a, second lateral direction 252b, third lateral direction 252c and fourth lateral direction 252d. In the present invention, an x-cube as shown in FIG. 4 may also be used as a light coupling component 252'. The LED assembly 26 comprises at least one LED module. In this embodiment, the LED assembly 26 comprises three LED modules, i.e., a first LED module 26a, a second LED module 26b and a third LED module 26c disposed along the first lateral direction 252a, the second lateral direction 252b and the third lateral direction 252c respectively. A plurality of light beams emitted from these LED modules 26a, 26b and 26c are adapted to be coupled into a single light beam by the x-plate light coupling component 252 or the x-cube light coupling component 252'. It should be noted herein that, as will be readily appreciated by those of ordinary skill in the art, other examples of the present invention may comprise more than three LED modules and the objective of the present invention may also be accomplished by appropriately adjusting the optical path and the light coupling manner.

In this embodiment, the LED light source module 24 comprises three relay lenses 251, which are disposed corresponding to the three LED modules 26a, 26b and 26c respectively to collect the light beams emitted from the LED modules 26a, 26b and 26c and transfer them to the x-plate light coupling component 252 or the x-cube light coupling component 252'. The condenser lens 253 is disposed along the fourth lateral direction 252d. The light beams transferred by the plurality of relay lenses 251 are coupled by the light coupling component 252 and then condensed by the condenser lens 253 for projection to the imaging module 23.

The compartment structure 27 comprises at least one first partition 271. In this embodiment, a plurality of first partitions 271 extend from side edges of the three relay lenses 251 to the side edges of the first LED module 26a, the second LED module 26b and the third LED module 26c respectively so that the three LED modules 26a, 26b, 26c, the three relay lenses 251, the plurality of first partitions 271 and the housing 29 corporately form three first enclosed subspaces 281 respectively. In this way, most of the noises produced by the LED modules 26a, 26b and 26c when being switched on and off at a high frequency may be effectively restricted within the first enclosed subspaces 281 and absorbed through multiple reflections, thereby reducing the probability of emitting noises out of the LED modules 24.

As the housing 29 is formed with an opening adjacent to the condenser lens 253 for the light beams to exit from the LED light source module 24, it is possible that a small portion of noises that are not absorbed in the first enclosed subspaces 281 may emit out of the LED light source module 24 therefrom. Accordingly, to further suppress and absorb these noises, the LED light source module 24 further comprises a plurality of second partitions 272 and at least one third partition 273.

In this embodiment, the second partitions 272 extend from a plurality of side edges of the x-plate light coupling component 252 shown in FIG. 3 or the x-cube light coupling component 252' shown in FIG. 4 to a plurality of side edges of the first partitions 271 respectively so that the three LED modules 26a, 26b, 26c, the plurality of second partitions 272, the light coupling component 252 and the housing 29 corporately form three second enclosed subspaces 282 respectively. It should be noted herein that the second partitions 272 may also extend from the light coupling component 252 directly to the side edges of the three LED modules 26a, 26b and 26c to corporately form three second enclosed subspaces 282 respectively, which may also accomplish the objective of forming the second enclosed subspaces 282 to suppress noises. The third partition 273 extends from at least one side edge of the condenser lens 253 to at least one side edge of the light coupling component 252 so that the light coupling component 252, the condenser lens 253, the third partition 273 and the housing 29 corporately form a third enclosed subspace 283. With this arrangement, noises that are not absorbed in the first enclosed subspaces 281 will be reflected and absorbed within the second enclosed subspace 282 and the third enclosed subspace 283, thereby imparting a better noise suppression capability to the LED light source module 24.

Preferably, in the present invention, the compartment structure 27 and the housing 29 are formed into one piece, which not only makes the assembling process more convenient, but also reduces the number of separate parts in the whole structure, thereby reducing the cost of parts and assembly and enhancing the noise suppression effect. However, the first partitions 271, the second partitions 272 and the third partition 273 may also be separate from the housing 29 and form enclosed subspaces by partitioning, connecting and enclosing optical components of the optical element assembly 25 and LED modules of the LED assembly 26; although the arrangement makes the assembling process more complex than the former scheme, the setup allows for flexibility in correcting the locations of individual elements.

According to the above descriptions, by using the compartment structures to form multiple levels of enclosed spaces in the projection device and the LED light source module of the present invention, noises produced by the LED module when being switched on and off at a high frequency can be effectively absorbed by the compartment structures and other elements within the enclosed spaces. Thereby, noises of the LED module as a whole get suppressed when operating with high power.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A LED light source module for a projection device, comprising:
an optical element assembly;
a LED assembly; and
a compartment structure extending from at least one side edge of the LED assembly to at least one side edge of the optical element assembly, wherein the LED assembly, the optical element assembly and the compartment structure form at least one enclosed space corporately.

2. The LED light source module as claimed in claim 1, wherein:
the LED assembly comprises at least one LED module;
the optical element assembly comprises at least one relay lens; and
the compartment structure comprises at least one first partition extending from at least one side edge of the at least one relay lens to at least one side edge of the at least one LED module, in which the at least one LED module, the at least one relay lens and the at least one first partition form a first enclosed subspace corporately.

3. The LED light source module as claimed in claim 2, wherein:
the LED assembly comprises three LED modules;
the optical element assembly comprises three relay lenses; and
the compartment structure comprises a plurality of first partitions extending from a plurality of side edges of the relay lenses to a plurality of corresponding side edges of the LED modules, in which the LED modules, the relay lenses and the first partitions form three first enclosed subspaces corporately.

4. The LED light source module as claimed in claim 3, wherein:
the optical element assembly further comprises a light coupling component having a first lateral direction, a second lateral direction and a third lateral direction, in which the LED modules are disposed along the first lateral direction, the second lateral direction and the third lateral direction of the light coupling component respectively, and the light coupling component is adapted to couple a plurality of light beams emitted from the LED modules; and
the compartment structure further comprises a plurality of second partitions extending from a plurality of side edges of the light coupling component to a plurality of side edges of the first partitions, in which the LED modules, the light coupling component and the second partitions form three second enclosed subspaces corporately.

5. The LED light source module as claimed in claim 4, wherein the light coupling component is an x-plate.

6. The LED light source module as claimed in claim 4, wherein the light coupling component is an x-cube.

7. The LED light source module as claimed in claim 4, wherein
the light coupling component further comprises a fourth lateral direction;
the optical element assembly further comprises a condenser lens disposed along the fourth lateral direction of the light coupling component for the light beams generated by the LED modules emitting out from the LED light source module through the light coupling component and the condenser lens; and
the compartment structure further comprises at least one third partition extending from at least one side edge of the condenser lens to at least one side edge of the light coupling component, in which the light coupling component, the condenser lens and the at least one third partition form a third enclosed subspace corporately.

8. The LED light source module as claimed in claim 7, wherein the LED light source module further comprises a housing receiving the LED assembly, the optical element assembly and the compartment structure.

9. The LED light source module as claimed in claim 8, wherein the housing and the compartment structure are formed into one piece.

10. A projection device, comprising an imaging module and a LED light source module, wherein the imaging module and the LED light source module are adapted to produce and project an image, and the LED light source module comprises:
an optical element assembly;
a LED assembly;
a compartment structure extending from at least one side edge of the LED assembly to at least one side edge of the optical element assembly, wherein the LED assembly, the optical element assembly and the compartment structure form at least one enclosed space corporately; and
a housing at least receiving the LED assembly, the optical element assembly and the compartment structure.

11. The projection device as claimed in claim 10, wherein:
the LED assembly comprises at least one LED module;
the optical element assembly comprises at least one relay lens; and
the compartment structure comprises at least one first partition extending from at least one side edge of the at least one relay lens to at least one side edge of the at least one LED module, in which the at least one LED module, the at least one relay lens and the at least one first partition form a first enclosed subspace corporately.

12. The projection device as claimed in claim 11, wherein:
the LED assembly comprises three LED modules;
the optical element assembly comprises three relay lenses; and
the compartment structure comprises a plurality of first partitions extending from a plurality of side edges of the relay lenses to a plurality of corresponding side edges of the LED modules, in which the LED modules, the relay lenses and the first partitions form three first enclosed subspaces corporately.

13. The projection device as claimed in claim 12, wherein:
the optical element assembly further comprises a light coupling component having a first lateral direction, a second lateral direction and a third lateral direction, in which the LED modules are disposed along the first lateral direction, the second lateral direction and the third lateral direction of the light coupling component respectively, and the light coupling component is adapted to coupling a plurality of light beams emitted from the LED modules; and
the compartment structure further comprises a plurality of second partitions extending from a plurality of side edges of the light coupling component to a plurality of side edges of the first partitions, in which the LED modules, the light coupling component and the second partitions form three second enclosed subspaces corporately.

14. The projection device as claimed in claim 13, wherein:
the light coupling component further comprises a fourth lateral direction;
the optical element assembly further comprises a condenser lens disposed along the fourth lateral direction of the light coupling component for the light beams generated by the LED modules emitting out from the LED light source module through the light coupling component and the condenser lens; and the compartment structure further comprises at least one third partition extending from at least one side edge of the condenser lens to at least one side edge of the light coupling component, in which the light coupling component, the condenser lens and the at least one third partition form a third enclosed subspace corporately.

15. The projection device as claimed in claim 14, wherein the housing and the compartment structure are formed into one piece.

* * * * *